US012637557B2

(12) United States Patent
    Kaarto

(10) Patent No.: US 12,637,557 B2
(45) Date of Patent: May 26, 2026

(54) HIGH CRYSTALLINE OLEFIN POLYMER FOR HIGH SPEED SPINNING

(71) Applicant: W.R. Grace & Co.-CONN., Columbia, MD (US)

(72) Inventor: John Kaarto, Lake Jackson, TX (US)

(73) Assignee: W.R. Grace & Co.-CONN., Columbia, MD (US)

( * ) Notice: Subject to any disclaimer, the term of this patent is extended or adjusted under 35 U.S.C. 154(b) by 151 days.

(21) Appl. No.: 18/039,703

(22) PCT Filed: Dec. 6, 2021

(86) PCT No.: PCT/US2021/062066
    § 371 (c)(1),
    (2) Date: May 31, 2023

(87) PCT Pub. No.: WO2022/125468
    PCT Pub. Date: Jun. 16, 2022

(65) Prior Publication Data
    US 2024/0018346 A1    Jan. 18, 2024

Related U.S. Application Data

(60) Provisional application No. 63/122,680, filed on Dec. 8, 2020.

(51) Int. Cl.
    *C08L 23/14*    (2006.01)
    *C08K 5/098*    (2006.01)
    (Continued)

(52) U.S. Cl.
    CPC ............ *C08L 23/142* (2013.01); *C08K 5/098* (2013.01); *C08K 5/14* (2013.01); *C08K 5/20* (2013.01); *C08K 5/3492* (2013.01); *C08K*

*5/5317* (2013.01); *C08K 5/5393* (2013.01); *D01D 5/0885* (2013.01); *D04H 1/4291* (2013.01); *D04H 1/56* (2013.01);
(Continued)

(58) Field of Classification Search
    None
    See application file for complete search history.

(56) References Cited

U.S. PATENT DOCUMENTS 12,276,358 B2    4/2025    Traidia et al.
2004/0038022 A1    2/2004    Maugans et al.
(Continued)

FOREIGN PATENT DOCUMENTS

EP    1055703    11/2000
JP    2000136212 A    5/2000
(Continued)

OTHER PUBLICATIONS

International Search Report and Written Opinion from PCT PCT/US2021/062066 dated Mar. 14, 2022, 11 pages.
(Continued)

*Primary Examiner* — Arti Singh-Pandey
(74) *Attorney, Agent, or Firm* — Dority & Manning, PA.

(57) ABSTRACT

A polymer composition includes a low ethylene random copolymer that can be used to form a meltspun or spunbond article at high spinning velocities. The polymer composition has a low xylene soluble content, a high crystallinity, or both, while having reduced spin-break at high spinning velocities. The polymer composition also exhibits good fiber tenacity and fabric softness.

20 Claims, 1 Drawing Sheet

(51) Int. Cl.

| | |
|---|---|
| *C08K 5/14* | (2006.01) |
| *C08K 5/20* | (2006.01) |
| *C08K 5/3492* | (2006.01) |
| *C08K 5/5317* | (2006.01) |
| *C08K 5/5393* | (2006.01) |
| *D01D 5/088* | (2006.01) |
| *D04H 1/4291* | (2012.01) |
| *D04H 1/56* | (2006.01) |

(52) U.S. Cl.

CPC .. *C08K 2201/012* (2013.01); *C08K 2201/014* (2013.01); *D10B 2321/022* (2013.01)

(56) References Cited

U.S. PATENT DOCUMENTS

| | | | |
|---|---|---|---|
| 2006/0199006 | A1 | 9/2006 | Poon et al. |
| 2012/0046400 | A1 | 2/2012 | Kaarto et al. |
| 2013/0018150 | A1 | 1/2013 | Walton et al. |
| 2016/0251462 | A1 | 9/2016 | Chou et al. |
| 2020/0140583 | A1 | 5/2020 | Kim et al. |
| 2020/0240058 | A1 | 7/2020 | Noh et al. |
| 2021/0324119 | A1 | 10/2021 | Van Paridon et al. |

FOREIGN PATENT DOCUMENTS

| | | | |
|---|---|---|---|
| JP | 2002105828 A | 4/2002 |
| JP | 2003089956 A | 3/2003 |
| JP | 2011-195661 A | 10/2011 |
| RU | 2 404 299 C2 | 11/2010 |
| WO | WO 2006/101927 A2 | 9/2006 |
| WO | WO 2008/137449 A1 | 11/2008 |

OTHER PUBLICATIONS

EP Search Report for PCT/US2021062066, mailed on Oct. 2, 2024, 8 pages.

Translation of Japanese Office Action, dated Jul. 3, 2025, 4 pages.

RU Search Report for 2023117654, mailed on Mar. 31, 2025, 2 pages.

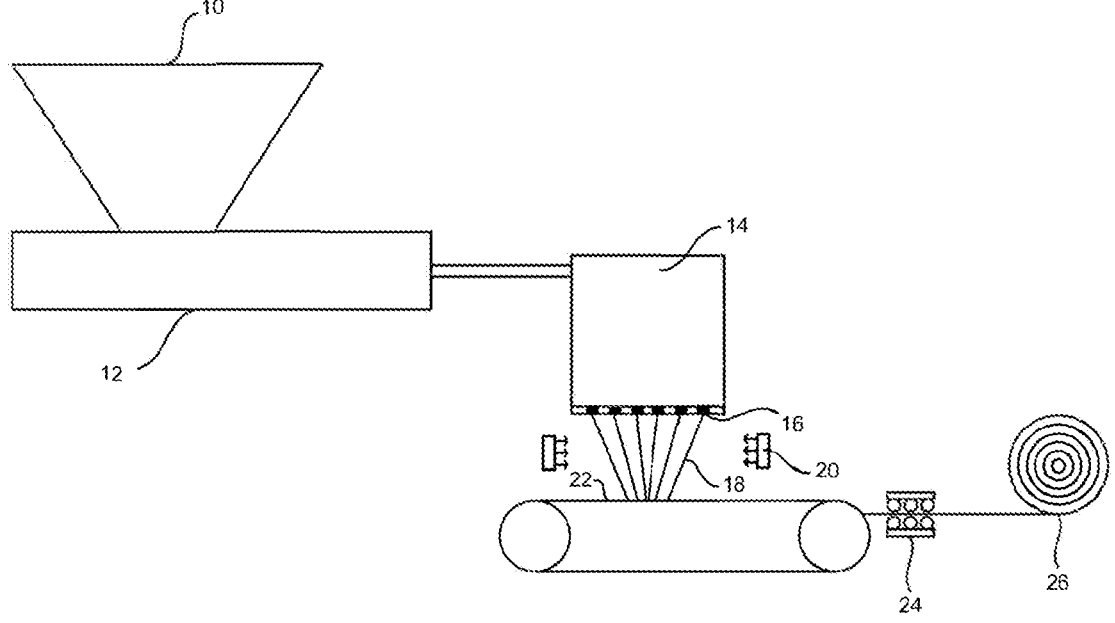

1

HIGH CRYSTALLINE OLEFIN POLYMER FOR HIGH SPEED SPINNING

CROSS-REFERENCE TO RELATED APPLICATIONS

This application is a U.S. National Stage of International Patent Application No. PCT/US2021/062066, filed Dec. 6, 2021, which claims the benefit of priority to U.S. Provisional Application No. 63/122,680, filed on Dec. 8, 2020, the entirety of which is incorporated herein by reference.

BACKGROUND

Nonwoven webs having high levels of strength and softness are desirable for many products such as personal care products, home items, automotive products, tarps, reusable bags, and the like. Polypropylene has been used in many applications in the form of nonwovens, molded articles, films, sheets, carpet face yarn, carpet backing, woven bags, rope, and twine as it has good processability, including good fiber spinnability, toughness, moisture resistance, and chemical resistance. Additionally, polypropylene is inexpensive and has a low specific gravity, which allows for high coverage at a low cost per square foot.

Nonwoven webs can be formed by many processes, including various meltspun processes. Exemplary processes for producing nonwoven webs include, for instance, spunbond processes and melt blown processes. Meltspun fibers are generally formed by melting at least one polymer and then drawing the fiber in the melt to a diameter less than the diameter of the die. Meltspun fibers may be cut into staple fibers and formed into nonwoven articles by off-line processes, such as needlepunching, hydro or air entanglement, and thermal bonding. Alternatively, spunbond fibers are not cut and may be bonded in-line after being formed by extruding a molten thermoplastic polymer composition as filaments through a plurality of fine, usually circular, die capillaries of a spinneret. Polypropylene polymers are increasingly used in meltspun processes due to polypropylene polymers having good tenacity, thermobondability, and resulting fabric tensile strength.

Fibers or filaments formed using a meltspun method can be used to form nonwovens by placing the fibers or filaments on a moving belt after extrusion. The belt may then carry the fibers or filaments to a bonding operation such as a heated roll where the fibers may be bonded in a web arrangement. At this point, the web may be wound up or put through further processing. Alternatively, the web may be used to form multilayer nonwovens, which may have at least one spunbond(S) outer layer and at least one melt blown (M) inner layer, in-line prior to bonding. The layers may be formed in a SMS arrangement, but additional layers and combinations are possible including SMNIS.

Regardless of the method of formation, it is desired that fibers used to form nonwovens yield a soft fabric and good coverage. However, these characteristics, in addition to other desirable attributes, often require fine fibers having a lower linear mass density or lower denier per fiber, as well as good bonding properties, which can be difficult to produce without spin-breaks. For instance, finer fibers may be obtained by using faster spinning velocities, but presently available polypropylene homopolymers and ethylene random copolymers suffer from spin-breaks at high spinning velocities.

Many attempts have been made to address this issue and to improve the spinnability of homopolymers and ethylene random copolymers while maintaining good bonding properties. For instance, recent approaches to improve spinning include cracking polymers to a narrow molecular weight distribution and limiting the amount of high molecular weight materials. However, to maintain bonding properties with the changes in molecular weight distribution the weight percentage of the polymer that is soluble in xylene was increased, or polymers having a high stereoblock content were used, which negatively impacted tenacity and strength.

While these approaches have addressed some of the present problems, there still remains a need to produce polypropylene homopolymers or ethylene random copolymers with improved bonding properties. Furthermore, it would be beneficial to provide a polypropylene homopolymer and/or ethylene random copolymers that is able to be spun at high speeds, such as at a velocity of about 2500 m/min or greater. Moreover, it would be beneficial to provide a polypropylene homopolymer and/or ethylene random copolymers that have a narrow molecular weight distribution (MWD) or low polydispersity index. In yet a further aspect, it may be desirable to provide a melt-spinnable fiber with a decreased linear mass density/finer denier. Furthermore, it would also be advantageous to provide a melt-spinnable fiber that has a high crystallinity and/or low xylene solubles (XS) content.

SUMMARY

In general, the present disclosure is directed to polypropylene polymer compositions that are well suited for producing fibers, including filaments. The polymer composition of the present disclosure, for instance, is well suited to producing melt spun webs at relatively high speeds without producing significant amounts of spin-breaks. Of particular advantage, not only is the polymer composition well suited to producing fibers at high speeds, but also can produce melt spun webs having a desirable balance of properties.

In one aspect, the present disclosure is directed to a polymer composition for forming a melt spun web, such as a spunbond web. The polymer composition contains a propylene and α-olefin random copolymer. The random copolymer contains α-olefin units in an amount less than about 1% by weight. In accordance with the present disclosure, the random copolymer has a rheological polydispersity index of about 3 or less after peroxide cracking. Before being subjected to peroxide cracking, the random copolymer has a xylene solubles content of about 2.7% by weight or less. After peroxide cracking, the random copolymer has a crystallinity of about 55% or greater. The cracked polymer composition exhibits a melt flow rate of about 20 dg/min or greater when testing according to ASTM Test D1238 at 230° C. and at a load of 2.16 kg.

In certain embodiments, the xylene solubles content of the random copolymer can be about 2% or less, such as about 1.8% or less. The crystallinity of the polymer can be about 60% or greater, such as about 65% or greater. The melt flow rate, in certain aspects, can be from about 25 dg/min to about 100 dg/min, such as from about 25 dg/min to about 75 dg/min, such as from about 35 dg/min to about 65 dg/min. The polydispersity index can be about 2.7 or less, such as about 2.5 or less. In one particular embodiment, the α-olefin is ethylene.

In addition to the random copolymer, the polymer composition can contain various other additives. For instance, the polymer composition can contain a lubricant, a processing aid, a stabilizer (antioxidant), an antacid, or combinations thereof. In one aspect, the composition contains at least a primary antioxidant, a secondary antioxidant, and an antacid. Each additive can be present in the composition at a concentration of from about 100 ppm to about 2500 ppm. For example, an antioxidant that may be present in the composition can be a phenolic antioxidant. An example of a lubricant that may be used in accordance with the present disclosure is ethylene bis-stearamide. Processing aids that can be incorporated into the composition include one or more fluoropolymers. An example of a stabilizer that can be incorporated into the composition is a phosphite. The composition may also contain an antacid, such as a stearate. In one embodiment, the antacid is calcium stearate.

The present disclosure is also directed to a spunbond nonwoven web made from the polymer composition as described above. The nonwoven web can include a plurality of continuous fibers that are bonded together. The fibers can have a linear mass density of less than about 2 denier per filament, such as about 1.5 denier per filament or less.

The present disclosure is also directed to a process for making a spunbond nonwoven web. According to the process, a polymer composition as described above is fed to an extruder. The polymer composition is heated into a molten state and extruded through a die to form filaments. The filaments are quenched and deposited onto a moving belt. The filaments are bonded together to form the nonwoven web. In one aspect, the filaments can be drawn at a high speed to a linear mass density of less than about 2 denier per filament.

Other features and aspects of the present disclosure are discussed in greater detail below.

BRIEF DESCRIPTION OF THE DRAWINGS

The invention will now be described, by way of example, with reference to the accompanying drawing, in which FIG. 1 is a view of one embodiment of a spunbond apparatus.

Definitions and Testing Procedures

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers. The melt flow rate can be measured in pellet form or on the reactor powder. When measuring the reactor powder, a stabilizing package can be added including 2000 ppm of Cyanox 2246 antioxidant, 2000 ppm of antioxidant Irgafos 168 and 1000 ppm of acid scavenger ZnO.

Polydispersity Index (PDI) is measured by an AR-G2 rheometer which is a stress control dynamic spectrometer manufactured by TA Instruments using a method according to Zeichner G R, Patel P D (1981) "A comprehensive Study of Polypropylene Melt Rheology" Proc. Of the 2n d World Congress of Chemical Eng., Montreal, Canada. An ETC oven is used to control the temperature at 180° C.±0.1° C. Nitrogen is used to purge the inside the oven to keep the sample from degradation by oxygen and moisture. A pair of 25 mm in diameter cone and plate sample holder is used. Samples are compression molded into mm×100 mm×2 mm plaque. Samples are then cut into squares and loaded on the center of the bottom plate. The geometries of upper cone is (1) Cone angle: 5:42:20 (deg:min:I):(2) Diameter: 25 mm; (3) Truncation gap: 149 micron. The geometry of the bottom plate is 25 mm cylinder.

Testing Procedure: (1) the cone & plate sample holder is heated in the ETC oven at 180° C. for 2 hours. Then the gap is zeroed under blanket of nitrogen gas. (2) Cone is raised to 2.5 mm and sample loaded unto the top of the bottom plate. (3) Start timing for 2 minutes. (4) The upper cone is immediately lowered to slightly rest on top of the sample by observing the normal force. (5) After two minutes the sample is squeezed down to 165 micron gap by lower the upper cone. (6) The normal force is observed. When the normal force is down to <0.05 Newton the excess sample is removed from the edge of the cone and plate sample holder by a spatula. (7) The upper cone is lowered again to the truncation gap that is 149 micron. (8) An Oscillatory Frequency Sweep test is performed under these conditions: Test delayed at 180° C. for 5 minutes. Frequencies: 628.3 r/s to 0.1 r/s. Data acquisition rate: 5 point/decade. Strain: 10% (9) When the test is completed the crossover modulus (Gc) is detected by the Rheology Advantage Data Analysis program furnished by TA Instruments. (10) PDI=100,000/Gc (in Pa units).

Ramp to Break test is a fiber spinning test where the filaments are drawn down from the die at progressively higher speeds until spin breaks occur. This test is repeated 3-5 times per sample and provides a means of evaluating/ comparing the high speed spin-ability of propylene-based polymer compositions. The test is run on a multifilament fiber extrusion spinning line manufactured by Hills R&D (Florida, USA) using a 144 hole die with 600 micron die holes using a fixed polymer flow of 0.37 g/min per hole. The polymer melt temperature is 230.degree. C. The line is set at 1500 meters/min and the spin velocity is increased (ramped) at 500 m/min/min using a mechanical take-off and the speed at which the filaments break is recorded.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-98 using a 90 minute precipitation time and is also referred to herein as the "wet method." Xylene solubles is measured on the reactor powder without the addition of any other additives and before peroxide cracking.

For the wet method, the procedure consists of weighing 2 g of sample and dissolving the sample in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

One method of determining crystallinity in the high crystalline polypropylene polymer is by differential scanning calorimetry (DSC). A small sample (milligram size) of the propylene polymer is sealed into an aluminum DSC pan. The sample is placed into a DSC cell with a 25 centimeter per minute nitrogen purge and cooled to about −80° C. A standard thermal history is established for the sample by heating at 10° C. per minute to 225° C. The sample is then cooled to about −80° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, \%} = \frac{\Delta H_{observed}}{\Delta H_{isotactic\ PP} \times 100}$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 164.92 Joules per gram (J/g) of polymer.

Alternatively, crystallinity may also be determined using a heat of crystallization upon heating (HCH) method. In a HCH method, a sample is equilibrated at 200° C. and held at the temperature for three minutes. After the isothermal step, data storage is turned on, and the sample is ramped to −80° C. at 10° C. per minute. When −80° C. is reached, the data sampling is turned off, and the sample is held at the temperature for three minutes. After the second isothermal step, the data storage is turned on and the sample is ramped to 200° C. at 10° C. per minute.

For convenience, ethylene content is also measured using a Fourier Transform Infrared method (FTIR) which is correlated to ethylene values determined using $^{13}$C NMR, noted above, as the primary method. The relationship and agreement between measurements conducted using the two methods is described in, e.g., J. R. Paxson, J. C. Randall, "Quantitative Measurement of Ethylene Incorporation into Propylene Copolymers by Carbon-13 Nuclear Magnetic Resonance and Infrared Spectroscopy", Analytical Chemistry, Vol. 50, No. 13, November 1978, 1777-1780.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As utilized herein with respect to numerical ranges, the terms "approximately," "about," "substantially," and similar terms will be understood by persons of ordinary skill in the art and will vary to some extent depending upon the context in which it is used. If there are uses of the terms that are not clear to persons of ordinary skill in the art, given the context in which it is used, the terms will be plus or minus 10% of the disclosed values. When "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The present disclosure is generally directed to polymer compositions that have improved spinning properties at high spinning velocities and that are well suited for forming meltspun webs and other nonwoven materials. Particularly, the present disclosure has unexpectedly found that a polymer composition of polypropylene and less than 1% by weight of α-olefin monomer units, having high crystallinity, a low xylene solubles content, or both a high crystallinity and a low xylene solubles content, exhibits good high spinning properties, such as reduced spin-breaks. Such a polymer composition containing less than 1% by weight of α-olefin monomer units is more commonly known as a minirandom or low ethylene random (LER) and may be referred to as such herein. The polymer composition may further have high crystallinity, such as a high crystallinity low ethylene random (i.e. HC-LER) either alternatively, or in addition to a low xylene solubles content. Particularly, it has unexpectedly been found that a high crystallinity and/or low xylene solubles polymer composition of a polypropylene and α-olefin copolymer that contains less than 1% by weight of α-olefin monomer units according to the present disclosure, can spin better than a standard homopolymer when tested using a ramp-to-break test while maintaining excellent fiber properties, such as fiber tenacity.

For instance, in one aspect, the polymer composition may exhibit improved spinnability as measured according to the ramp-to-break test, and may not exhibit spin-breaks at spin velocities of about 2000 meters/minute (m/min) or greater, such as about 2250 m/min or greater, such as about 2500 m/min or greater, such as about 2750 m/min or greater, such as about 3000 m/min or greater, such as about 3250 m/min or greater, such as about 3500 m/min or greater, such as about 3750 m/min or greater, such as up to about 4000 m/min, or any ranges or values therebetween.

Furthermore, the present disclosure has found that the polymer composition may also have a narrow polydispersity index that may also contribute to improved high-speed spinning. For instance, in one aspect, the polymer composition may have a polydispersity index (PI) of about 3 or less, such as about 2.7 or less, such as about 2.5 or less, such as about 2.3 or less, such as about 1 or greater, such as about 2.0 or greater, such as about 2.2 or greater, or any ranges or values therebetween.

In yet a further aspect, the polymer composition of the present disclosure may also exhibit a relatively high melt flow rate (MFR). The higher melt flow rate may allow the polymer composition to spin up to about 20% faster than lower melt flow rate products. In one embodiment the polymer composition has a cracked MFR of about 25 dg/minute or greater, such as about 30 dg/min or greater, such as about 35 dg/min or greater, such as about 40 dg/min or greater, such as about 50 dg/min or greater, such as about 60 dg/min or greater, such as about 70 dg/min or greater, such as about 80 dg/min or greater, such as about 90 dg/min or greater, such as about 100 dg/min or greater, such as less than 150 dg/min, such as less than 125 dg/min, such as less than 100 dg/min, such as less than 80 dg/min, such as less than 58 dg/min, or any ranges or values therebetween, and, in one aspect, the MFR may be from about 35 dg/min to about 75 dg/min, such as 35 dg/min to about 55 dg/min, as determined according to ISO Test 1133 at 230° C. with a load of 2.16 kg.

In one aspect and as discussed above, the polymer composition according to the present disclosure may also include α-olefin monomer units in an amount of about 1% or less by weight of the polypropylene and α-olefin monomer units, such as about 0.8% or less, such as about 0.7% or less, such as about 0.6% or less, such as about 0.5% or less, such as about 0.4% or less, such as about 0.1% or greater, such as about 0.2% or greater, such as about 0.3% or greater, such as about 0.4% or greater, such as about 0.5% or greater α-olefin monomer units by weight of the polypropylene and α-olefin monomer units in the polymer composition. In one embodiment the α-olefin monomer unit may be a C2-C6 α-olefin or may be a C2-C4 α-olefin. Alpha-olefins well suited for use in the copolymer may be ethylene or butene. In yet another embodiment, the α-olefin may comprise more than one different α-olefin monomer unit.

Increased spinnability is beneficial as it may lead to increased productivity as well as fibers with a lower linear mass density (i.e. finer denier), which can contribute to fibers having a softer feel and better coverage properties when formed into an article. Particularly, it was unexpectedly found that a polymer composition according to the present disclosure can exhibit improved spinnability while having potentially improved bonding and coverage properties. For instance, increased spin speeds as well as increased spinnability can also lead to fibers with a lower linear mass density, which is desirable for nonwovens as they may yield a softer fabric. A further benefit of finer fibers is increased coverage, or less open area in a nonwoven. Increased coverage is beneficial for many applications using nonwovens as they may be used as protective coverings or absorbent articles. Additionally, it has been found that random copolymers as discussed herein may also lead to softer spunbond fabrics. Nonetheless, the present disclosure has found that the polymer composition is able to exhibit good spinning at high velocities.

Particularly, as discussed, due at least in part to the improved spinning properties, the polymer composition of the present disclosure may be spun so as to produce a fine denier per filament (dpf), where a denier is the grams per 9000 meters and denier per filament is the denier divided by the number of filaments, having a low linear mass density.

In one embodiment, the composition may be drawn to a linear mass density of less than about dpf, such as less than about 4 dpf, such as less than about 3 dpf, such as less than about 2.5 dpf, such as less than about 2 dpf, such as less than about 1.5 dpf, such as less than about 1.2 dpf, such as less than about 1 dpf.

In another aspect, the polymer composition according to the present disclosure may have a high crystallinity, a low weight percent of xylene solubles, or a combination thereof, which may contribute to a higher strength, while still exhibiting excellent spinning properties.

For instance, lowering the xylene soluble fraction of the polymer composition may improve fiber tenacity as well as fabric strength while unexpectedly providing improved spinning properties. Therefore, in one aspect, the present disclosure has found that the polymer composition may have a xylene solubles content (prior to peroxide cracking) of about 3% or less, such as about 2.9% or less, such as about 2.8% or less, such as about 2.7% or less, such as about 2.6% or less, such as about 2.5% or less, such as about 2.4% or less, such as about 2.3% or less, such as about 2.2% or less, such as about 2.1% or less, such as about 2% or less, such as about 1.9% or less, such as about 1.8% or less, such as about 1.7% or less, such as about 1.6% or less, such as about 1.5% or less, or any ranges or values therebetween.

Moreover, the present disclosure has found that the polymer composition may have a high degree of crystallinity after peroxide cracking while maintaining good spinning properties. In addition, the polymer composition can be produced with a relatively low xylene soluble content, which may cause the polymer composition to solidify quickly resulting in a higher proportionate amount of smectic or mesomorphic polypropylene in the formed fibers, which may improve bonding, especially in a continuous in-line spinning process.

In one aspect, the polymer composition may exhibit a high degree of crystallinity. Particularly, in one aspect, the polymer composition may have a % crystallinity after peroxide cracking of about 50% or greater, such as about 55% or greater, such as about 60% or greater, such as about 65% or greater, such as about 70% or greater, such as about 85% or less, such as about 80% or less, such as about 75% or less, or any ranges or values therebetween. Surprisingly, even though the polymer composition according to the present disclosure has a high degree of crystallinity, the polymer composition still exhibits excellent spinning properties as discussed above.

Notwithstanding the above, the polymer composition may be further understood according to the following discussion of the FIGURE. However, it should be understood that the present disclosure is not limited to the aspects discussed below.

In one embodiment of a method and apparatus for producing polymer articles in accordance with the present disclosure, initially a first extruder is used to produce compounded pellets that are then fed to a second extruder for producing filaments in a nonwoven web. In the first extruder, for instance, the polymer composition is peroxide cracked, additivated, extruded and cut into pellets.

Peroxide cracking is also referred to as a visbreaking process. During visbreaking, higher molar mass chains of the polypropylene polymer are broken in relation to the lower molar mass chains. Visbreaking results in an overall decrease in the average molecular weight of the polymer and an increase in the melt flow rate. Visbreaking can produce a polymer with a lower molecular weight distribution or polydispersity index. The amount of visbreaking that occurs within the polymer can be quantified using a cracking ratio. The cracking ratio is calculated by dividing the final melt flow rate of the polymer by the initial melt flow rate of the polymer.

The random polypropylene copolymer can be subjected to visbreaking according to the present disclosure using a peroxide as a visbreaking agent. Typical peroxide visbreaking agents are 3,6,9-triethyl-3,6,9-trimethyl-1,4,7-triperoxo-nane, 2,5-dimethyl-2,5-bis(tert.butyl-peroxy)hexane (DHBP), 2,5-dimethyl-2,5-bis(tert.butyl-peroxy)hexyne-3 (DYBP), dicumyl-peroxide (DCUP), di-tert.butyl-peroxide (DTBP), tert.butyl-cumyl-peroxide (BCUP) and bis(tert.butylperoxy-isopropyl)benzene (DIPP). The above peroxides can be used alone or in a blend.

Visbreaking the random polypropylene copolymer can be carried out during melt processing in the first extruder. For instance, the random polypropylene copolymer can be fed through the extruder and the visbreaking agent can be added to the extruder once the polymer is in a molten state. Alternatively, the visbreaking agent can be preblended with the polypropylene polymer. In one aspect, for instance, the visbreaking agent can be first compounded with a polymer, such as a polypropylene polymer to form a masterbatch. The masterbatch containing the visbreaking agent can then be blended with the polypropylene polymer and fed through the extruder. In still another aspect, the visbreaking agent can be physically blended with the random polypropylene copolymer, such as being imbibed on the polymer powder. In general, any suitable extruder can be used during visbreaking. For instance, the extruder can be a single-screw extruder, a contra-rotating twin-screw extruder, a co-rotating twin-screw extruder, a planetary-gear extruder, a ring extruder, or any suitable kneading apparatus.

The amount of visbreaking agent added to the random polypropylene copolymer can depend upon various factors, including the cracking ratio that is desired. In general, the visbreaking agent or peroxide can be added to the random polypropylene copolymer in an amount greater than about 0.001% by weight, such as greater than about by weight, such as greater than about 0.01% by weight, such as greater than about by weight, such as greater than about 0.02% by weight, such as greater than about by weight, such as greater than about 0.05% by weight, such as greater than about weight, In general, the visbreaking agent is added to the polypropylene polymer in an amount less than about 0.2% by weight, such as in an amount less than about 0.15% by weight, such as in an amount less than about 0.1% by weight.

After visbreaking, the random polypropylene copolymer has a higher melt flow rate and can also have a narrower molecular weight distribution or polydispersity index. In general, the polypropylene polymer can be subjected to visbreaking so as to have a cracking ratio of greater than about 2, such as greater than about 3, such as greater than about such as greater than about 8, such as greater than about 10 and generally less than about such as less than about 15, such as less than about 12.

The resulting visbroken pellets can also contain at least one antioxidant, at least one antacid, and various other optional additives. These pellets are then fed to a second extruder as shown in FIG. 1. More particularly, FIG. 1 illustrates an embodiment of an apparatus which may be used for producing spunbond fibers and additionally a nonwoven web, and also may be used to illustrate a method of forming a spunbond article according to the present disclosure. The apparatus may generally include a hopper which feeds the polymer pellets as described above, components thereof, optionally an additive masterbatch, a pigment masterbatch, or combinations thereof, into an extruder. It should be noted that while FIG. 1 displays a single hopper and a single feed in portion into the extruder, that in another embodiment there may be multiple hoppers which all feed into a single feed point or which may feed into separate portions of the extruder. All or a portion of a polymer composition may be fed into an extruder at a downstream location from the initial hopper feed point, or alternatively all of the composition may enter the extruder at a single feed point as portrayed in FIG. 1.

As described above, the polymer composition of the present disclosure, particularly peroxide cracked polymer pellets are first formed prior to being fed to the extruder as illustrated in FIG. 1. Forming the pellets in a first extrusion step, for instance, can produce a more homogeneous material that is then later used to form fibers. Optionally, a single extruder can be used to produce the fibers.

The extruder may be any of those known in the art used for the heating and mixing of a polymer composition. In one embodiment, the extruder may be a single or twin screw extruder. In another embodiment, the extruder may have a heat gradient in which the polymer is heated incrementally as it proceeds through the extruder.

The apparatus of the present disclosure may further include a gear pump or another transfer mechanism, which transfers the molten polymer composition from the extruder to the extrusion die.

The extrusion die may be a conventional die, such as, for example, a spinnerette generally containing three or more holes up to several hundred or several thousand, e.g. from about 500 to about 30,000 depending on the process. The holes may have any conventional diameter, in one embodiment, the holes may have a diameter of less than about 1 mm, such as less than about 0.8 mm, such as less than about 0.7 mm, and such as greater than about 0.1 mm, such as greater than about 0.3 mm, such as greater than about 0.5 mm. In one embodiment, the extrusion die may have about 4000 holes per meter width of the die and the holes may each have a diameter of about 600 μm.

The spinnerette may also include a flow facilitating device to uniformly distribute the molten polymer to all orifices of the spinnerette and to assist in orienting the polymer molecules. The molten polymer may be supplied from the extruder and/or gear pump to the spinnerette at any suitable flow rate. The flow rate generally depends on the total number of passageways in the die and the size of the die. In general, the flow rate is from about 2500 cm$^3$/min, to about 7000 cm$^3$/min.

A composition of the present disclosure may be spun at a temperature of from at least about 175° C., such as at least about 200° C., such as at least about 225° C., such as at least about 250° C., such as at least about 275° C., such as less than about 325° C., such as less than about 300° C., such as less than 275° C., such as less than about 250° C. or any ranges or values therebetween. In one aspect, the spinning temperature is from about 225° C. to about 265° C.

Following extrusion through the die or spinnerette, the resulting fibers may remain in the molten state for some distance before they may be quenched. Quenching may be accomplished by chilled air blown through the fibers or may be accomplished by other processes used in the art. After quenching, the fibers may be taken up on a collector, moving belt, or another take-up surface. In one embodiment, the moving belt may be an open mesh screen, wherein the fibers impinge on the moving belt as they are laid down. Regardless of the type of melt spinning procedure used, some cold drawing may be necessary in order to orient the polymer molecules for good tenacity. When used, cold drawing may generally be conducted after the fibers have solidified.

The moving belt or collector may include a surface which holds the fibers to the moving belt such as a vacuum or another releasable attachment. This holding mechanism may be used to maintain the placement of the fibers on the moving belt until bonding and/or winding occurs.

Placement of the fibers on a moving belt or collector may generally be in a random pattern which may resemble a web or may be laid in a linear arrangement. In one embodiment, fibers placed in a linear manner may be fed into a winder to be spooled for later use. In another embodiment, fibers that have been placed into a web like arrangement may be bonded using various methods such as a heated roll or any other method known in the field. One embodiment may use a heated roll such as a calender roll which may have a plurality of raised dots. The raised dots may be in any pattern or arrangement and may be shaped and sized to create a bond pattern on a bonded web.

Bonding may be conducted at a fairly high temperature, alternatively bonding may occur at a fairly low temperature. A low temperature, such as less than about 150° C., such as less than about 140° C., such as less than about 130° C., such as less than about 120° C. may be selected so as to maintain the drape of the fabric after bonding. Whereas, in an alternative embodiment a higher temperature, such as greater than about 120° C., such as greater than about 130° C., such as greater than about 140° C., such as greater than about 150° C. may be selected to improve bond strength.

In an additional aspect, a bond pattern may be selected which increases the percentage or number of fibers which may be bonded to each other, and in another embodiment a bond pattern may be selected in which only a low percentage or number of fibers may be bonded to each other. In one embodiment, after bonding, the fibers may be attached in the web like arrangement and wound using a winder or another similar winding process.

Regardless of the above discussed process, in one aspect, the polymer composition may be formed in any way known in the art. For example, the high crystalline polymer of the present invention can be prepared by various process, for example in a single stage or multiple stages, by such polymerization methods such as slurry polymerization, gas phase polymerization, bulk polymerization, solution polymerization or a combination thereof. A Ziegler-Natta catalyst combined with a suitable internal/external donor combination that will produce a polypropylene product with xylene solubles of less than about 3.5 wt. %, such as less than about 3 wt. %, such as less than about 2.8 wt. %, such as less than about 2.5 wt. %, such as less than about 2 wt. %, as measured by the method described above, may be used in an embodiment of the present disclosure.

In a further aspect, any of the polymer compositions described above may further include at least one spin aid, at least one additive, or combinations thereof. The additive may comprise an antioxidant, a lubricant, a stabilizer, an antacid, or a mixture thereof. Spin aids may be considered processing aids. Each spin aid or additive may be used in the polymer composition in an amount such as at least about 0.005 wt. %, such as at least about 0.01 wt. %, such as at least about 0.05 wt. %, such as at least about 0.1 wt. %, such as at least about 0.5 wt. %, such as at least about 1.0 wt. %, such as at least about 1.5 wt. %, such as less than about 2.0 wt. %, such as less than about 1.5 wt. %, such as less than about 1.25 wt. %, such as less than about 1.0 wt. %, such as less than about 0.5 wt. %, such as less than about 0.1 wt. %.

In one aspect, the polymer composition contains a primary antioxidant, a secondary antioxidant (e.g. phosphite), and an antacid (e.g. CaSt or ZnO). In one aspect, the antioxidant has anti-gas fading properties such as Irganox 3114, Cyanox 1790, or Irganox 1425WL. Alternately, the antioxidant system can be non-gas fading, i.e. free of phenolic antioxidants, and be based on a combination of HALS (hindered amine light stabilizer) with either/both a hydroxylamine stabilizer (e.g. Irganox FS042) and a phosphite secondary antioxidant. The antioxidant can minimize the oxidation of polymer components and organic additives in the polymer blends. The polymer composition, for instance, can contain a phosphite and/or phosphonate antioxidant alone or in combination with other antioxidants. Non-limiting examples of suitable antioxidants include phenols such as 2,6-di-t-butyl-4-methylphenol; 1,3,5-trimethyl-2,4,6-tris (3',5'-di-t-butyl-4'-hydroxybenzyl)benzene; tetrakis[(methylene(3,5-di-t-butyl-4-hydroxyhydrocinnamate)]methane; acryloyl modified phenols; octadecyl-3,5-di-t-butyl-4-hydroxycinnamate; 1,3,5-tris(3,5-di-tert-butyl-4-hydroxybenzyl)-1,3,5-triazine-2,4,6(1H,3H,5H)-trione (e.g. Irganox 3114 supplied by BASF); calcium-bis (((3,5-bis(1,1-dimethylethyl)-4-hydroxyphenyl)methyl)-ethylphosphonate) (e.g. Irganox 1425WL supplied by BASF). Another antioxidant than may be used is 1,3,5-triazine-2,4,6(1H,3H,5H)-trione, 1,3,5-tris[[4-(1,1-dimethylethyl)-3-hydroxy-2,6-dimethylphenyl]methyl] (e.g. Cyanox 1790 from Solvay). In another aspect the antioxidant can be N,N-dioctadecylhydroxylamine (e.g. FS042). Phosphites and phosphonites may generally be used in combination with the above hindered phenols; hydroxylamines may generally be used in combination with a hindered amine light stabilizer or a phosphite. Other antioxidants include benzofuranone derivatives; and combinations thereof.

The polymer composition can also contain an antacid that operates as an acid scavenger. The antacid can be a stearate, a metal oxide, a hydrotalcite, magnesium aluminum hydroxide carbonate, or mixtures thereof. Examples of particular antacids include calcium stearate, zinc stearate, magnesium oxide, zinc oxide, and mixtures thereof.

In some embodiments, the additive may include a lubricant. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, and combinations thereof. One embodiment of a fatty acid amide lubricant that may be used is N,N' Ethylene bisstearamide. If included in sufficient amounts, various stearates may also serve as lubricants. For example, higher levels of a metal stearate, such as zinc stearate, may serve as an internal lubricant.

In some embodiments, the polymer composition can optionally include a stabilizer that may prevent or reduce the degradation of the polymer blends by UV radiations. Non-limiting examples of suitable UV stabilizers include benzophenones, hindered amines, benzotriazoles, aryl esters, oxanilides, acrylic esters, formamidines, carbon black, nickel quenchers, phenolic antioxidants, metallic salts, zinc compounds, and combinations thereof.

In some embodiments, the spin aid may include a processing aid. The processing aid is selected from the group consisting of polydimethylsiloxane, other organopolysiloxanes, tartaric acid, stearic acid, fluoropolymer processing aids, tartaric acid, or mixtures thereof. Suitable processing aids for use in the present invention may include fluoropolymers including fluoro elastomers and crystalline or semi-crystalline fluoroplastics, or blends thereof. The fluoropolymers as a class can be crystalline or generally amorphous.

The present invention, thus generally described, will be understood more readily by reference to the following examples, which are provided by way of illustration and are not intended to be limiting of the present invention.

EXAMPLE

Three polymer compositions were prepared according to the present disclosure as well as a comparative sample.

Polymer 1 is a high crystallinity minirandom polymer composition of polypropylene and ethylene monomer units.

Polymer 1 contains 0.55 wt % ethylene and has 1.3% xylene solubles (measured on powder resin). Blend 1 is also referred to as HCLER (high crystallinity low ethylene random).

Polymer 2 is a minirandom polymer composition of polypropylene and ethylene monomer units. Blend 2 contains 0.54 wt % ethylene and 2.7 wt % xylene solubles (measured on powder resin). Blend 2 is referred to as LER.

Polymers 1 and 2 were additivated and cracked with organic peroxide to a target MFR of 39+/−2 g/10 min.

A commercial visbroken PP homopolymer grade was used as a comparative.

Comparative 1: 5D49, is a homopolymer supplied by DOW having a 3.5 wt. % xylene solubles and a 38 MFR as measured on extruded pellets.

Table 1 shows properties of the HCLER and LER samples, while Tables 2 and 3 list the additives that were present in each sample. As shown in Table 1, Sample Nos. 1-18B were all subjected to peroxide cracking.

TABLE 1

| Run | Polymer Type | Pellet MFR | Peroxide (ppm) | PDI | ΔH melting (J/g) | ΔH cooling (J/g) | % Crystal-linity |
|---|---|---|---|---|---|---|---|
| 1 | HCLER | 37.0 | 950 | 2.5 | 111.1 | 103.2 | 67.33 |
| 2 | HCLER | 37.0 | 950 | 2.5 | 111.5 | 104.6 | 67.58 |
| 3 | HCLER | 39.9 | 950 | 2.5 | 112.5 | 106.1 | 68.18 |
| 4 | HCLER | 38.1 | 950 | 2.5 | 111.7 | 105.8 | 67.70 |
| 5 | HCLER | 37.8 | 950 | 2.5 | 110.2 | 103.1 | 66.79 |
| 6 | HCLER | 37.4 | 950 | 2.5 | 113.7 | 107.8 | 68.91 |
| 7 | HCLER | 37.0 | 950 | 2.5 | 116.9 | 110.2 | 70.85 |
| 8 | HCLER | 38.0 | 950 | 2.5 | 118.2 | 111.5 | 71.64 |
| 9 | HCLER | 40.4 | 950 | 2.5 | 107.2 | 101.4 | 64.97 |
| 10 | HCLER | 38.8 | 950 | 2.5 | 113.1 | 105.4 | 68.55 |
| 12 | LER | 37.0 | 1050 | 2.3 | 101.90 | 84.80 | 61.76 |
| 13 | LER | 32.0 | 1050 | 2.3 | 89.64 | 87.71 | 54.33 |
| 14 | LER | 37.5 | 1050 | 2.3 | 99.22 | 92.33 | 60.13 |
| 15 | LER | 37.8 | 1050 | 2.3 | 99.12 | 92.83 | 60.07 |
| 16 | LER | 38.0 | 1050 | 2.3 | 97.89 | 92.82 | 59.33 |
| 17 | LER | 40.0 | 1050 | — | 102.70 | 93.73 | 62.24 |
| 18 | LER | 39.6 | 1000 | 2.3 | 104.40 | 95.48 | 63.27 |
| 18B | LER | 39.6 | 1000 | 2.3 | 100.80 | 95.95 | 61.09 |
| Control | | 36.7 | | 2.8 | 110 | 102.4 | 66.7 |

TABLE 2

| RUN | Powder Type | ZnO | CaSt | Anti-oxidant 1* | Anti-oxidant 2** | Anti-oxidant 3*** | Anti-oxidant 4**** | EBS 1***** | Fluoropolymer processing aid | Nucleating agent | NaBz |
|---|---|---|---|---|---|---|---|---|---|---|---|
| 1 | HCLER | | 350 | 600 | | 1000 | | | | | |
| 2 | HCLER | | 350 | 400 | | 800 | | | | | |
| 3 | HCLER | | 350 | 400 | | | 400 | | | | |
| 4 | HCLER | | 350 | 400 | | | 400 | 2000 | | | |
| 5 | HCLER | | | 400 | | | 400 | | | | 1500 |
| 6 | HCLER | | 350 | 400 | | | 400 | | | 1500 | |
| 7 | HCLER | | 350 | 400 | | | 400 | 2000 | 500 | 1500 | |
| 8 | HCLER | | 350 | 400 | | 800 | | 2000 | 500 | 1500 | |
| 9 | HCLER | | 350 | 400 | | | 400 | 2000 | 500 | | |
| 10 | HCLER | 200 | | 400 | | | 400 | 2000 | 500 | | |

Antioxidant 1: 1,3,5-tris(3,5-di-tert-butyl-4-hydroxybenzyl)-1,3,5-triazine-2,4,6(1H,3H,5H)-trione Antioxidant 2: calcium-bis (((3,5-bis(1,1-dimethylethyl)-4-hydroxyphenyl)methyl)-ethylphosphonate) with 50% wax Antioxidant 3: Tris(2,4-ditert-butylphenyl)phosphite Fluoropolymer: Dyneon FX5911

Nucleating Agent: Adeka NA-71

Antioxidant 4: Tetrakis(2,4-di-tert-butylphenyl)-4,4-biphenyldiphosphonite

EBS 1: N,N' Ethylene bisstearamide

TABLE 3

| RUN | Powder Type | Quantity lbs | ZnO | DHT4A | CaSt | Anti-oxidant 1 | Anti-oxidant 2 | Anti-oxidant 3 | Anti-oxidant 4 | EBS | Fluoropolymer Processing Aid |
|---|---|---|---|---|---|---|---|---|---|---|---|
| 12 | LER | 40 | | | 350 | 600 | | 1000 | | | |
| 13 | LER | 40 | | | 500 | 400 | | 800 | | | |
| 14 | LER | 40 | | 300 | | 400 | | 800 | | | |
| 15 | LER | 40 | 200 | | | 400 | | 800 | | | |
| 16 | LER | 40 | 200 | | | 800 | | 800 | | | |
| 17 | LER | 40 | 200 | | | | 750 | 750 | | | |

TABLE 3-continued

| RUN | Powder Type | Quantity lbs | ZnO | DHT4A | CaSt | Anti-oxidant 1 | Anti-oxidant 2 | Anti-oxidant 3 | Anti-oxidant 4 | EBS | Fluoropolymer Processing Aid |
|---|---|---|---|---|---|---|---|---|---|---|---|
| 18 | LER | 40 | 200 | | | | 750 | | 400 | | |
| 18B | LER | 40 | 200 | | | | 750 | | 400 | 2000 | 500 |

Antioxidant 1: 1,3,5-tris(3,5-di-tert-butyl-4-hydroxybenzyl)-1,3,5-triazine-2,4,6(1H,3H,5H)-trione
Antioxidant 2: calcium-bis (((3,5-bis(1,1-dimethylethyl)-4-hydroxyphenyl)methyl)-ethylphosphonate)
Antioxidant 3: Tris(2,4-ditert-butylphenyl)phosphite
Antioxidant 4: Tetrakis(2,4-di-tert-butylphenyl)-4,4-biphenyldiphosphonite
EBS 1: N,N' Ethylene bisstearamide
Fluoropolymer: Dyneon FX 5911

Table 4 shows a comparison of low ethylene polymers and the controls. The ramp-to-break test was run in triplicate, the average of which is displayed in the average break speed column.

TABLE 4

| Polymer Type | Spin Run | Break Speed m/min | Break Speed m/min | Break Speed m/min | Avg Break Speed m/min | ZNO ppm | CaSt ppm | Anti-oxidant 1* ppm | Anti-oxidant 2** ppm | Peroxide ppm | MFR dg/min | Pl std | Tc (° C.) DSC |
|---|---|---|---|---|---|---|---|---|---|---|---|---|---|
| HCLER | 1 | 3600 | 3500 | 3550 | 3550 | | 350 | 600 | 1000 | 950 | 37.0 | 2.5 | 115.4 |
| HCLER | 2 | 3550 | 3550 | 3600 | 3567 | | 350 | 400 | 800 | 950 | 37.0 | 2.5 | 115.0 |
| LER | 10 | 3660 | 3675 | 3621 | 3652 | | 350 | 600 | 1000 | 1050 | 37.0 | 2.34 | 113.6 |
| LER | 12 | 3600 | 3550 | 3592 | 3581 | | 500 | 400 | 800 | 1050 | 32.0 | 2.29 | 113.9 |
| LER | 16 | 3558 | 3572 | 3535 | 3555 | 200 | | 800 | 800 | 1050 | 38.0 | 2.31 | 113.9 |
| Control | 20 | 3300 | 3300 | 3400 | 3333 | 200 | | 800 | 800 | | 38.0 | 2.79 | 113.7 |

Antioxidant 1: 1,3,5-tris(3,5-di-tert-butyl-4-hydroxybenzyl)-1,3,5-triazine-2,4,6(1H,3H,5H)-trione
Antioxidant 2: Tris(2,4-ditert-butylphenyl)phosphite
Peroxide: 2,5-Dimethyl-2,5-di(tert-butylperoxy)hexane Table 5 shows the results of the ramp-to-break test as well as the obtained denier per fiber for blends 1 and 2, as well as results for the control.

TABLE 5

| | Break speed m/min. | Break speed m/min. | Break speed m/min. | Avg break spd m/min | dpf |
|---|---|---|---|---|---|
| HCLER # 1 | 3600 | 3500 | 3550 | 3550 | 1.21 |
| HCLER # 2 | 3550 | 3550 | 3600 | 3567 | 1.22 |
| HCLER # 3 | 3600 | 3670 | 3700 | 3657 | 1.21 |
| HCLER # 4 | 3400 | 3690 | 3620 | 3570 | 1.22 |
| HCLER # 5 | 3680 | 3550 | 3360 | 3530 | 1.24 |
| HCLER # 6 | 3759 | 3681 | 3687 | 3709 | 1.25 |
| HCLER # 7 | 3770 | 3723 | 3780 | 3758 | 1.2 |
| HCLER # 8 | 3719 | 3704 | 3726 | 3716 | 1.22 |
| HCLER # 9 | 3789 | 3800 | 3772 | 3787 | 1.22 |
| HCLER # 10 | 3600 | 3575 | 3670 | 3615 | 1.25 |
| LER # 12 | 3660 | 3675 | 3621 | 3652 | 1.23 |
| LER # 13 | 3600 | 3550 | 3592 | 3581 | 1.23 |
| LER # 14 | 3690 | 3696 | 3689 | 3692 | 1.23 |
| LER # 15 | 3721 | 3723 | 3735 | 3726 | 1.23 |
| LER # 16 | 3558 | 3572 | 3535 | 3555 | 1.2 |
| LER # 17 | 3663 | 3737 | 3642 | 3681 | 1.21 |
| LER # 18 | 3654 | 3680 | 3677 | 3670 | 1.23 |
| LER # 18B | 3734 | 3731 | 3737 | 3734 | 1.23 |
| Control | 3300 | 3300 | 3400 | 3333 | 1.21 |

Embodiment 1. A polymer composition for forming a melt spun web, the polymer composition comprising:

a propylene and α-olefin random copolymer;

wherein:

the random copolymer comprises α-olefin monomer units in an amount of less than about 1% by weight;

the random copolymer having been peroxide cracked;

the random copolymer exhibiting a rheological polydispersity index of about 3 or less after peroxide cracking, a xylene solubles content of about 2.7 wt. % or less prior to peroxide cracking, and a crystallinity of about 55% or greater after peroxide cracking; and the polymer composition exhibits a melt flow rate of about 20 dg/minute or greater (according to ASTM D1238, at 230° C. with a load of 2.16 kg).

Embodiment 2. The composition of Embodiment 1, wherein the xylene solubles content is about 2% or less.

Embodiment 3. The composition of Embodiment 1, wherein the xylene solubles content is about 1.8% or less.

Embodiment 4. The composition of any one of Embodiments 1-3, wherein the crystallinity is about 60% or greater.

Embodiment 5. The composition of any one of Embodiments 1-4, wherein the crystallinity is about 65% or greater.

Embodiment 6. The composition of any one of Embodiments 1-5, wherein the α-olefin is ethylene.

Embodiment 7. The composition of any one of Embodiments 1-6, wherein the melt flow rate is about 25 dg/min to about 100 dg/min.

Embodiment 8. The composition of any one of Embodiments 1-7, wherein the melt flow rate is about 25 dg/min to about 75 dg/min.

Embodiment 9. The composition of any one of Embodiments 1-8, wherein the melt flow rate is about 35 dg/min to about 65 dg/min.

Embodiment 10. The composition of any one of Embodiments 1-9, wherein the polydispersity index is about 2.7 or less.

Embodiment 11. The composition of any one of Embodiments 1-10, wherein the polydispersity index is about 2.5 or less.

Embodiment 12. The composition of any one of Embodiments 1-11, wherein the polymer composition includes an antacid and a stabilizer.

Embodiment 13. The composition of Embodiment 12, wherein the polymer composition further comprises a lubricant, a processing aid, or a combination of any two or more thereof.

Embodiment 14. The composition of Embodiment 12 or Embodiment 13, wherein the stabilizer is present in a concentration of about 100 ppm up to about 2500 ppm.

Embodiment 15. The composition of Embodiment 13 or Embodiment 14, wherein the lubricant comprises ethylene bis-stearamide, the processing aid comprises a fluoropolymer, the stabilizer comprises a phosphite, and the antacid comprises calcium stearate.

Embodiment 16. The composition of any one of Embodiments 1-11, wherein the composition comprises a primary antioxidant, optionally a secondary antioxidant, and an antacid.

Embodiment 17. The composition of Embodiment 16, wherein the primary or secondary antioxidant comprises a phenolic antioxidant, the lubricant comprises ethylene bis-stearamide, the processing aid comprises a fluoropolymer, the stabilizer comprises a phosphite, and the antacid comprises calcium stearate Embodiment 18. The composition of any one of Embodiments 1-11, wherein the composition comprises a primary antioxidant and an optional secondary antioxidant, wherein the primary antioxidant or the optional secondary antioxidant comprises a phenolic antioxidant; a lubricant comprising ethylene bis-stearamide; a processing aid comprising a fluoropolymer; a stabilizer comprising a phosphite; and an antacid comprising calcium stearate.

Embodiment 19. A spunbond nonwoven web comprising, a plurality of fibers comprising the polymer composition of any one of any one of Embodiments 1-18, wherein the plurality of fibers are bonded together to form the web.

Embodiment 20. The spunbond nonwoven web of Embodiment 19, comprising fibers having a linear mass density (denier, grams/9000 meters) of less than about 2 denier per filament.

Embodiment 21. The spunbond nonwoven web of Embodiment 19 or Embodiment 20, comprising fibers having a linear mass density (denier, grams/9000 meters) of less than about 1.5 denier per filament Embodiment 22. A process for making a spunbond nonwoven web, the process comprising feeding the polymer composition of any one of Embodiments 1-18 into an extruder, the polymer composition being heated into a molten state and extruded through a die to form filaments, quenching the filaments, depositing the filaments on a moving belt, and bonding the filaments together to form a nonwoven web.

Embodiment 23. The process of Embodiment 22, further comprising drawing the filaments at a high speed to a linear mass density (grams/9000 meters) of less than about 2 denier per filament.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A polymer composition for forming a melt spun web, the polymer composition comprising: a propylene and α-olefin random copolymer; wherein: the random copolymer comprises α-olefin monomer units in an amount less than 1% by weight; the random copolymer having been peroxide cracked; the random copolymer exhibiting a rheological polydispersity index of 3 or less after peroxide cracking, a xylene solubles content of 2.7 wt. % or less prior to peroxide cracking, and a crystallinity of 55% or greater after peroxide cracking; and the polymer composition exhibits a melt flow rate of 20 dg/minute or greater (according to ASTM D1238, at 2300 C with a load of 2.16 kg).

2. The composition of claim 1, wherein the xylene solubles content is 2% or less.

3. The composition of claim 1, wherein the xylene solubles content is 1.8% or less.

4. The composition of claim 1, wherein the crystallinity is 60% or greater.

5. The composition of claim 1, wherein the crystallinity is 65% or greater.

6. The composition of claim 1 wherein the α-olefin is ethylene.

7. The composition of claim 1, wherein the melt flow rate is 25 dg/min to 100 dg/min.

8. The composition of claim 7, wherein the melt flow rate is 35 dg/min to 65 dg/min.

9. The composition of claim 1, wherein the polydispersity index is 2.7 or less.

10. The composition of claim 1, wherein the polydispersity index is 2.5 or less.

11. The composition of claim 1, wherein the polymer composition includes an antacid and a stabilizer.

12. The composition of claim 11, wherein the polymer composition further comprises a lubricant, a processing aid, or a combination of any two or more thereof.

13. The composition of claim 12, wherein the lubricant comprises ethylene bis-stearamide, the processing aid comprises a fluoropolymer, the stabilizer comprises a phosphite, and the antacid comprises calcium stearate.

14. The composition of claim 11, wherein the stabilizer is present in a concentration of about 100 ppm up to about 2500 ppm.

15. The composition of claim 1, wherein the composition comprises a primary antioxidant, optionally a secondary antioxidant, and an antacid.

16. The composition of claim 1, wherein the composition comprises a primary antioxidant and an optional secondary antioxidant, wherein the primary antioxidant or the optional secondary antioxidant comprises a phenolic antioxidant; a lubricant comprising ethylene bis-stearamide; a processing aid comprising a fluoropolymer; a stabilizer comprises comprising a phosphite; and an antacid comprises comprising calcium stearate.

17. A spunbond nonwoven web comprising, a plurality of fibers comprising the polymer composition of claim 1, wherein the plurality of fibers are bonded together to form the web.

18. The spunbond nonwoven web of claim 17, comprising fibers having a linear mass density (denier, grams/9000 meters) of less than 2 denier per filament.

19. A process for making a spunbond nonwoven web, the process comprising feeding the polymer composition of claim 1 into an extruder, the polymer composition being heated into a molten state and extruded through a die to form filaments, quenching the filaments, depositing the filaments on a moving belt, and bonding the filaments together to form a nonwoven web.

20. The process of claim 19, further comprising drawing the filaments at a high speed to a linear mass density (grams/9000 meters) of less than 2 denier per filament.

* * * * *